(12) United States Patent
Vast et al.

(10) Patent No.: US 7,936,660 B2
(45) Date of Patent: May 3, 2011

(54) OPTICAL DISK FOR AN IDENTIFICATION ELEMENT

(75) Inventors: Nathalie Vast, Mont Saint Eloi (FR); Pierre Doublet, Saint Brice (FR)

(73) Assignee: Arjowiggins Security, Issy les Moulineaux (FR)

( * ) Notice: Subject to any disclaimer, the term of this patent is extended or adjusted under 35 U.S.C. 154(b) by 754 days.

(21) Appl. No.: 11/658,567

(22) PCT Filed: Jul. 13, 2005

(86) PCT No.: PCT/FR2005/050579
§ 371 (c)(1), (2), (4) Date: Jan. 8, 2008

(87) PCT Pub. No.: WO2006/021703
PCT Pub. Date: Mar. 2, 2006

(65) Prior Publication Data
US 2009/0196158 A1    Aug. 6, 2009

(30) Foreign Application Priority Data
Jul. 30, 2004  (FR) ..................... 04 51745

(51) Int. Cl.
*G11B 7/24* (2006.01)
(52) U.S. Cl. ................ 369/275.3; 369/283
(58) Field of Classification Search ........... 369/275.4, 369/275.5, 283, 47.36, 280, 288; 705/18; 234/492, 380; 362/147, 153; 235/454, 492
See application file for complete search history.

(56) References Cited

U.S. PATENT DOCUMENTS

| 5,447,767 | A | 9/1995 | Tanabe et al. |
| 6,902,111 | B2 * | 6/2005 | Han et al. ............ 235/454 |
| 7,032,822 | B2 | 4/2006 | Waters |
| 7,128,272 | B2 | 10/2006 | Doublet |
| 7,275,040 | B2 * | 9/2007 | Forster et al. ............ 705/18 |
| 7,360,712 | B2 * | 4/2008 | Trantoul et al. ......... 235/492 |
| 2003/0133401 | A1 | 7/2003 | Dausmann et al. |
| 2004/0023597 | A1 | 2/2004 | Truong |
| 2004/0054594 | A1 | 3/2004 | Forster et al. |
| 2005/0230966 | A1 | 10/2005 | Trantoul et al. |

FOREIGN PATENT DOCUMENTS
DE    100 32 604 A1    1/2002
(Continued)

OTHER PUBLICATIONS

T. Narahara et al., "Optical Disc System for Digital Video Recording", Jpn. J. Appl. Phys., vol. 39, Part 1, No. 2B, (Feb. 2000) pp. 912-919.

*Primary Examiner* — Ali Neyzari
(74) *Attorney, Agent, or Firm* — Oliff & Berridge, PLC

(57) ABSTRACT

An optical disk is provided that includes a face carrying information that is readable by a laser while the disk is being driven in rotation, the face being defined by a flexible structure; a support stiffening the flexible structure and including at least one fiber layer having a thickness; and an identification and/or authentication element carried by the support, the identification and/or authentication element being configured to emit a detectable signal on being illuminated by the laser that is used for reading the information present on the face, the identification and/or authentication element being inside and/or outside the support.

16 Claims, 2 Drawing Sheets

FOREIGN PATENT DOCUMENTS

| | | |
|---|---|---|
| EP | 1 291 815 A2 | 3/2003 |
| FR | 2 832 354 | 5/2003 |
| GB | 2 341 845 A | 3/2000 |
| WO | WO 99/54842 A1 | 10/1999 |
| WO | WO 01/24169 A1 | 4/2001 |
| WO | WO 02/075645 A1 | 9/2002 |
| WO | WO 02/075654 A2 | 9/2002 |
| WO | WO 03/015016 A2 | 2/2003 |
| WO | WO 03/100721 A1 | 12/2003 |

* cited by examiner

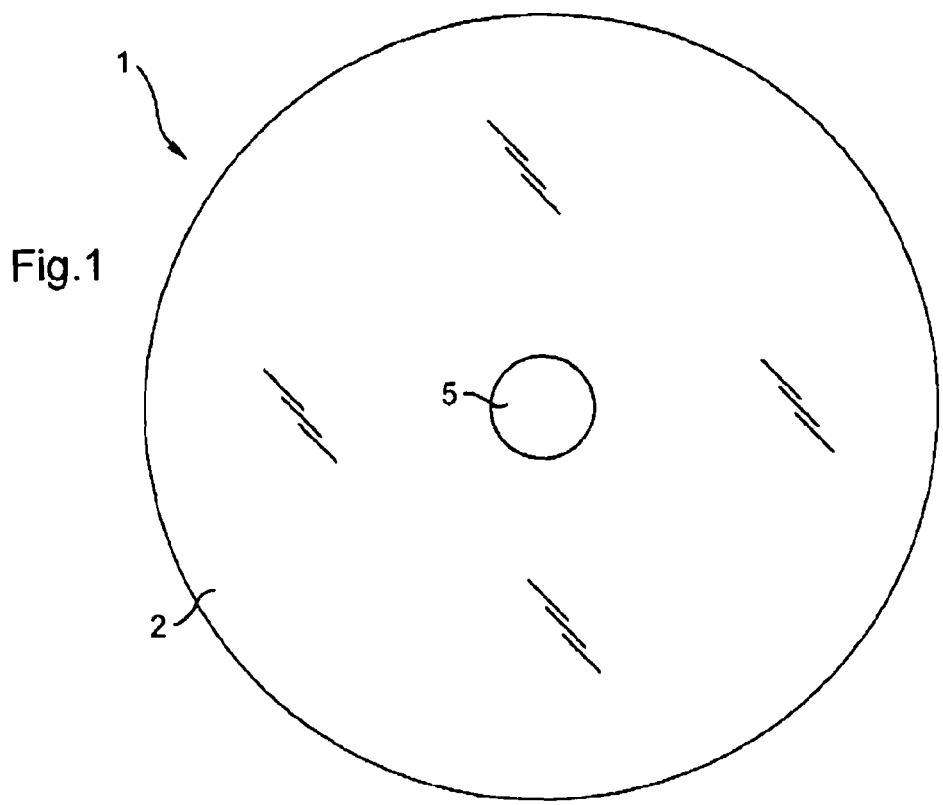
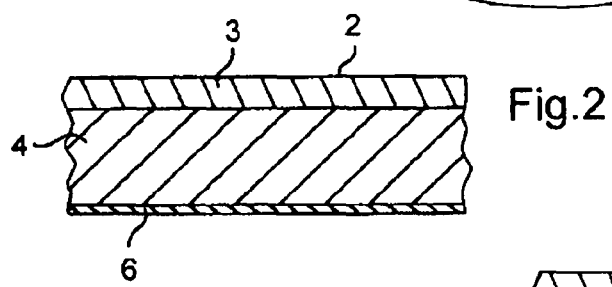
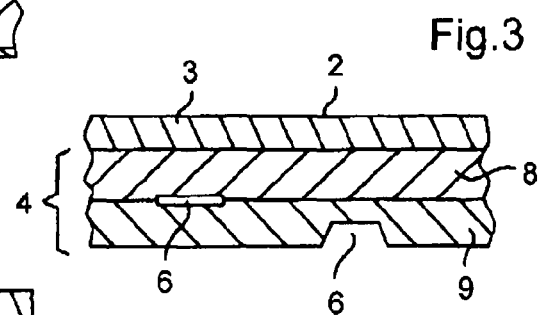
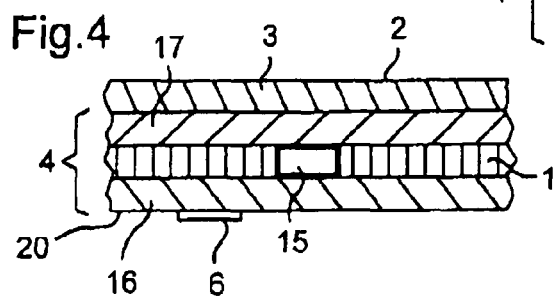
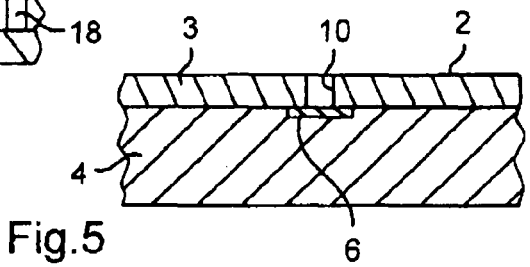

OPTICAL DISK FOR AN IDENTIFICATION ELEMENT

BACKGROUND

The present invention relates to optical disks.

The term "optical disk" is used to mean a disk having at least one face carrying information that is readable by means of a laser while the disk is rotating. The disk may optionally be rewritable. Examples of optical disks include CDs, DVDs, and HD-DVDs.

Also, optical disks comprising a flexible structure defining a face that is readable by means of a laser beam of blue color, together with a paper support for stiffening the flexible structure, are sold by the supplier Sony.

US patent application No. US 2004/0054594 describes an optical disk provided with a radio frequency identification (RFID) device. Other optical disks are described in the following publications: GB 2 341 845, WO 02/075654, and US 2003/0133401.

Application EP-A2-1 291 815 relates to a card for storing data concerning a patient, the card including a chip and a layer of aluminum for storing data. The layer of aluminum is disposed between a layer of plastics material that is sufficiently thick to stiffen the layer of aluminum, and a transparent layer that allows the information stored in the aluminum layer to be read. A layer of paper may be placed on the stiffening layer made of plastics material so that data can be printed thereon, however the layer of paper does not serve to stiffen the layer of aluminum.

SUMMARY

There exists a need to reduce the risk of optical disks being reproduced illegally and to combat counterfeiting of audio-visual and software works.

The invention seeks specifically to satisfy this need.

In one of its aspects, the invention achieves this by means of an optical disk that can be characterized by the fact that it comprises:

a face carrying information that is readable by a laser while the disk is being driven in rotation, said face being defined by a flexible structure;

a support serving to stiffen the flexible structure and comprising at least one fiber layer; and an identification and/or authentication element carried by the support.

Without the support, the disk does not present sufficient stiffness to enable it to be read.

The presence of the fiber layer makes it easier to incorporate in the optical disk an RFID device and/or any other authentication and/or identification element. The term "RFID device" is used to mean any device capable at least of being read remotely by means of radio frequency radiation. By way of example, an RFID device may comprise a chip with an integrated antenna, a chip and an antenna that are separate and carried by a common module, a chip that is connected via electrical connections to an antenna made of wire or printed on the support, or indeed a chip having an integrated antenna that is coupled to an independent antenna carried by the support. The chip may be based on silicon or on an organic polymer.

When the disk includes an RFID device, it is preferably situated at least in part in the thickness of the fiber layer.

When the disk includes an authentication and/or identification element other than an RFID device, the element may be selected for example from: an element for revealing falsification, in particular an element that is visible and/or detectable using a specific detector device, an element presenting an optical effect that is variable and/or diffractive, interferential, iridescent, or using liquid crystals, a coating that is magnetic or crystalline, magnetic fibers, tracers that are detectable by magnetic resonance, tracers that are detectable by X-ray fluorescence, biomarkers, a varnish or an ink, tracers that are luminescent or fluorescent, compounds that photochromic, thermochromic, electroluminescent, and/or piezochromic, and/or that change color on contact with one or more predetermined substances, a watermark, and an element capable of emitting a detectable signal on being illuminated by a laser, in particular a Kerr effect magneto-optical element.

In an embodiment of the invention, the fiber layer comprises papermaking fibers, e.g. cellulose fibers.

The fiber layer may present an outside face that is printed. Where appropriate, the presence of the fiber layer can make it possible to apply printing with quality that is better than that possible on a rigid structure made of plastics material. The fiber layer may in particular be printed prior to the support being secured to the laser-readable flexible structure. The flexible structure may be superposed entirely on the support.

The optical disk may be arranged in such a manner as to be capable of being read by a laser that emits in the blue, thus making it possible to increase the quantity of information that can be contained in the disk.

In another of its aspects, the invention also provides a method of reading a disk as defined above that includes an RFID device, in which method information is exchanged with the RFID device.

For example, the content of a memory of the RFID device may be read and use of the disk may be authorized only when the information read from the RFID device corresponds with information associated with the user or present in the optical data on the disk, i.e. information that can be read by the laser.

The invention also provides a reader device for reading a disk as defined above, the device comprising at least one optical reader capable of reading the optical data on the disk, and an RFID reader capable of reading the data of the RFID device present in the disk, e.g. capable of reading from a memory of the RFID device and/or of writing therein.

The reader device may also be arranged to compare at least one item of information obtained by reading optical data and at least one item of information coming from the RFID device so as to authorize use of the disk in the event of said items corresponding.

The reader device may also be arranged to compare at least one item of information coming from the RFID device with at least one item of information external to the reader device, e.g. downloaded or input by the user via a keyboard.

The invention also provides a method of manufacturing a disk as defined above, in which method the RFID device is programmed as a function of optical data present on the disk.

The invention also provides a method of manufacturing a disk as defined above, in which method optical data is written as a function of at least one item of information contained in the RFID device.

Independently or in combination with the above, the invention also provides a reader device for reading a disk as defined above, the device being characterized by the fact that it comprises at least one optical reader capable of reading the optical data of the disk and at least one sensor capable of detecting a signal emitted by an identification and/or authentication element in response to excitation by the laser beam of the optical reader device. By way of example, the device may be arranged to authorize reading of the disk when the detected signal presents a predefined characteristic.

The invention also provides a method of reading a disk as defined above, in which the laser beam used for reading the optical data on the disk is used to excite an identification and/or authentication element capable of emitting a detectable signal in response to said excitation. Depending on the detected signal, it is possible to prevent access to certain data on the disk, for example.

BRIEF DESCRIPTION OF THE DRAWINGS

The invention can be better understood on reading the following detailed description of non-limiting embodiments thereof, and on examining the accompanying drawings, in which:

FIG. 1 is a diagram of a disk made in accordance with the invention;

FIG. 2 is a diagrammatic and fragmentary section of the FIG. 1 disk in a first embodiment of the invention;

FIGS. 3 to 5 are views analogous to FIG. 2 of various embodiments;

DETAILED DESCRIPTION OF EMBODIMENTS

Figure 6:
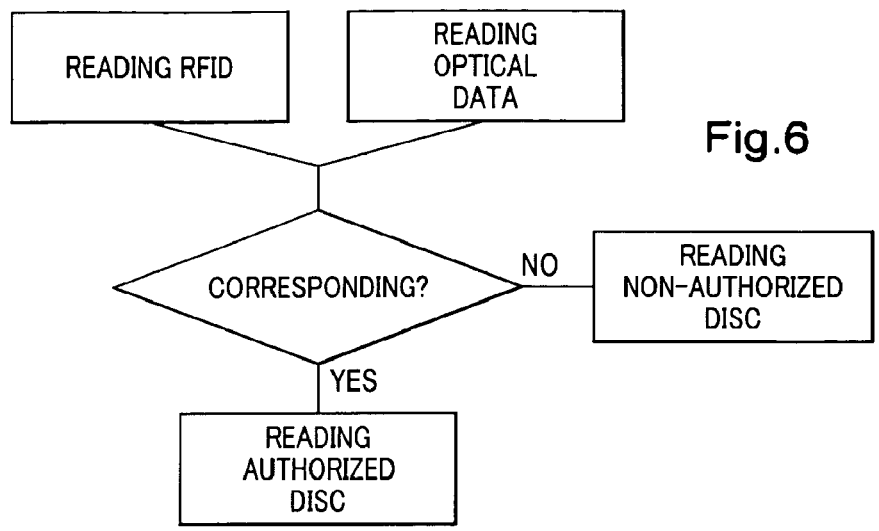
FIGS. 6 and 7 are block diagrams showing examples of methods of the invention.

The disk 1 shown in FIG. 1 presents a face 2 carrying data that can be read by a laser while the disk is being driven in rotation, e.g. a laser that emits in the blue (Blue-Ray Disc Technology).

The face 2 is defined by a flexible structure 3 secured to a support 4 serving to stiffen it, as can be seen in FIG. 2.

By way of example, the disk 1 is circular in shape having a hole 5 at its center for engaging means for centering and rotating the disk. In a variant, the disk presents an outline that is not circular, e.g. presenting a credit card format.

In accordance with an aspect of the invention, the support 4 has at least one fiber layer which may include at least one authentication and/or identification element 6, which element may be inside and/or outside the fiber layer 4.

By way of example the layer may be made of paper or card.

In the example of FIG. 2, the element 6 is constituted, for example, by printing using an ink, in particular an ink that is magnetic, thermochromic, fluorescent, and/or including iridescent pigments.

The support 4 may have only one fiber layer, or it may have a plurality of superposed fiber layers, as shown in FIG. 3. In FIG. 3, the support 4 has two fiber layers 8 and 9, e.g. two plies of paper. The plies may be stuck together, having a first authentication and/or identification element 6 at their interface, e.g. a security thread.

In the example shown, the outermost fiber layer 9 also presents at least one second authentication and/or identification element 6, constituted specifically by a watermark.

In accordance with another aspect of the invention, the support 4 may include at least one RFID device 15, as shown in FIG. 4.

By way of example, the RFID device 15 may comprise a chip having a memory capable of storing information, together with an antenna that is integrated with the chip and/or independent thereof, e.g. carried by a module to which the chip is secured prior to being incorporated in the support 4.

The chip of the RFID device 15 may also be connected to an antenna made of wire or made by silkscreen printing, or otherwise, the antenna being carried by at least one of the layers constituting the support 4.

The invention is not limited to a particular RFID device 15, and reference can usefully be made to patent applications WO 03/100721, WO 99/54842, and FR 2 832 354 which describe incorporating RFID devices in papers or the like.

In the example of FIG. 4, the support 4 has an outer fiber layer 16, an inner fiber layer 17, and an intermediate layer 18 with the RFID device 15 being received at least in part in the thickness of the intermediate layer.

As shown in this figure, the support 4 may optionally include an authentication and/or identification element 6 on its outside face 20, such as an optically-variable patch, for example.

In the variant embodiment shown in FIG. 5, the authentication and/or identification element 6 is placed in such a manner as to be capable of receiving the light emitted by a laser beam, in particular the beam used for reading the optical data.

For this purpose, the structure 3 may include a hole 10 and the authentication and/or identification element 6 may be placed behind the hole.

In this variant embodiment, the authentication and/or identification element 6 is selected to emit a signal that is detectable on being illuminated by the laser beam.

By way of example, the element 6 is a magneto-optical element making use of the Kerr effect, or it may include a luminescent compound that is excited by the energy from the laser. The effect of the laser beam on the element 6 may be detected by means of an appropriate sensor, possibly after reflection or transmission.

By way of example, the detected signal may enable the disk 1 to be authenticated or may be a prerequisite to starting reading thereof.

In a variant, the hole 10 may be replaced by special treatment of the flexible layer 3 so that it does not constitute a screen to the laser beam, thus enabling the beam to reach the element 6.

US patent application US 2004/0023597, the content of which is incorporated in the present application by reference, describes examples of light-sensitive compounds suitable for being used to make an authentication and/or identification element 6.

Figure 8:
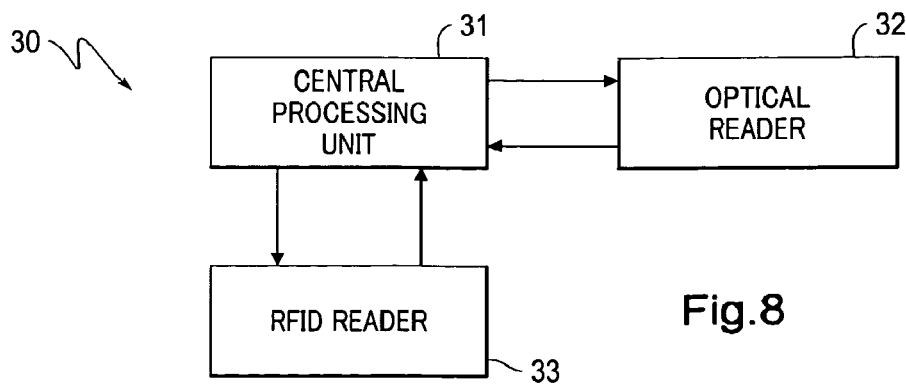
FIG. 8 is a diagram of an optical disk reader made in accordance with an implementation of the invention.

By way of example, a disk 1 including an RFID device 15 as described above can be used in a reader device 30 as shown diagrammatically in FIG. 8, the device comprising a central processor unit (CPU) 31 capable of exchanging information with an optical reader 32 and an RFID reader 33.

By way of example, the optical reader 32 comprises a laser emitting in the blue and serving to read and/or write data on the optical disk.

The RFID reader 33 comprises an antenna serving to exchange information remotely with the RFID device 15, possibly while the disk is rotating.

By way of example, the CPU 31, the optical reader 32, and the RFID reader 33 constitute a single appliance, or in a variant only the optical reader 32 and the RFID reader 33 constitute a single appliance, which is then suitable for being connected to the CPU 31 of a personal computer or a portable terminal, for example.

While a disk 1 is in use in the reader device 30, and as shown in FIG. 6, it is possible for example to read the RFID device 15 and also to read the optical data on the disk, and in the event of the data that is read corresponding, then reading of all or part of the other data on the disk is authorized, whereas otherwise the reader device 30 refuses the user access to the data on the optical disk.

In a variant, the reader device 30 is arranged to read the RFID device 15 and to compare the data read with verification data coming from an external source of information, e.g. data input by the user via a keyboard or data downloaded from a server on an Internet or local network or via a portable terminal such as a mobile telephone, and providing the data read from the RFID device corresponds with the verification data, use of the optical disk is authorized for read and/or write purposes.

In another variant, the reader device 30 is arranged to read the signal that results from exciting the authentication and/or identification element 6 by the laser beam prior to reading the optical data, and as a function of the signal detected, it can authorize or refuse reading of at least some of the data. By way of example, detection may be performed by a sensor that is magnetic, inductive, capacitive, electrical, or optical, depending on the nature of the identification and/or authentication element 6 used. Where appropriate, the same reader as is used for reading the optical data can also be used for receiving the signal emitted by the authentication and/or identification element after it has been excited by the laser beam, in particular when the element 6 includes a luminescent compound.

Figure 7:
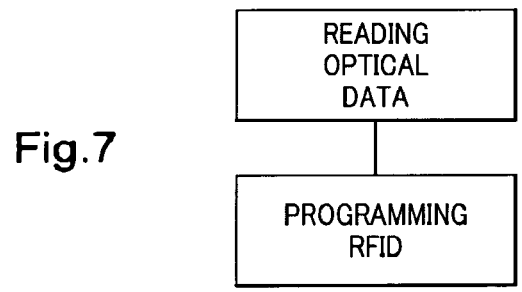

During manufacture of the disk 1, it is possible for example to read the optical data on the disk and then to program the RFID device 15 as a function of the data as read, as is shown in FIG. 7. By way of example, the RFID device 15 may be programmed so that an identification code appearing in the optical data is stored in an encrypted form.

In a variant, it is also possible to read the RFID device, e.g. to read its serial number, and then to write that number in the optical data of the disk.

Naturally, the invention is not limited to the examples described above.

Where appropriate, the device 1 may have two opposite faces each carrying optical data.

These faces may be defined by flexible structures united by a support comprising at least one fiber layer and at least one identification and/or authentication element. The support may house an RFID device, for example.

The invention is not limited to particular optical reader means using a laser that emits in the blue, and it is possible to use other types of laser.

The characteristics of the variant embodiments described above can be combined with one another.

Throughout the description, including in the claims, the term "comprising a" should be understood as being synonymous with "comprising at least one" unless specified to the contrary.

The invention claimed is:

1. An optical disk comprising:
a face carrying information that is readable by a laser while the disk is being driven in rotation, said face being defined by a flexible structure;
a support stiffening the flexible structure and comprising at least one fiber layer having a thickness; and
an identification and/or authentication element carried by the support, the identification and/or authentication element being configured to emit a detectable signal on being illuminated by the laser that is used for reading the information present on the face, said identification and/or authentication element being inside and/or outside the support.

2. A disk according to claim 1, wherein the disk includes an RFID device.

3. A disk according to claim 2, wherein the RFID device is situated at least in part in the thickness of the at least one fiber layer.

4. A disk according to claim 1, wherein the identification and/or authentication element is selected from:
an element for revealing falsification,
an element that is visible and/or detectable using a specific detector device,
an element presenting an optical effect that is variable and/or diffractive, interferential, iridescent, or using liquid crystals,
a coating that is magnetic or crystalline,
magnetic fibers,
tracers that are detectable by magnetic resonance,
tracers that are detectable by X-ray fluorescence,
biomarkers,
a varnish or an ink,
tracers that are luminescent or fluorescent,
compounds that include photochromic, thermochromic, electroluminescent, and/or piezochromic, and/or that change color on contact with one or more predetermined substances,
a watermark,
an element capable of emitting a detectable signal on being illuminated by a laser, and
a Kerr effect magneto-optical element.

5. A disk according to claim 1, wherein the at least one fiber layer comprises papermaking fibers.

6. A disk according to claim 1, wherein the at least one fiber layer comprises a plurality of plies of paper.

7. A disk according to claim 1, wherein the at least one fiber layer comprises an outside face that is printed.

8. A disk according to claim 1, wherein the flexible structure is configured to be read by an emitter that emits in blue light.

9. A disk according to claim 1, wherein the structure is configured to avoid constituting a screen to radiation from the laser so as to enable the radiation to reach the identification and/or authentication element in such a manner as to generate the signal.

10. A disk according to claim 9, wherein the identification and/or authentication element is a magneto-optical element.

11. A disk according to claim 9, wherein the identification and/or authentication element comprises a luminescent compound.

12. A method of reading a disk as defined in claim 2, in which information is exchanged with the RFID device.

13. An assembly comprising: a disk as defined in claim 2 and a device for reading said disk, wherein the device comprises at least one optical reader capable of reading optical data of the disk and an RFID reader capable of reading data of the RFID device present in the disk.

14. An assembly according to claim 13, wherein the device is configured to compare at least one item of information coming from reading the optical data and at least one item of information coming from the RFID device, in order to authorize use of the disk in the event that said items correspond.

15. A method of manufacturing a disk as defined in claim 2, in which the RFID device is programmed as a function of optical data present on the disk.

16. A method of manufacturing a disk as defined in claim 2, in which optical data is written as a function of at least one item of information contained in the RFID device.

* * * * *